UNITED STATES PATENT OFFICE.

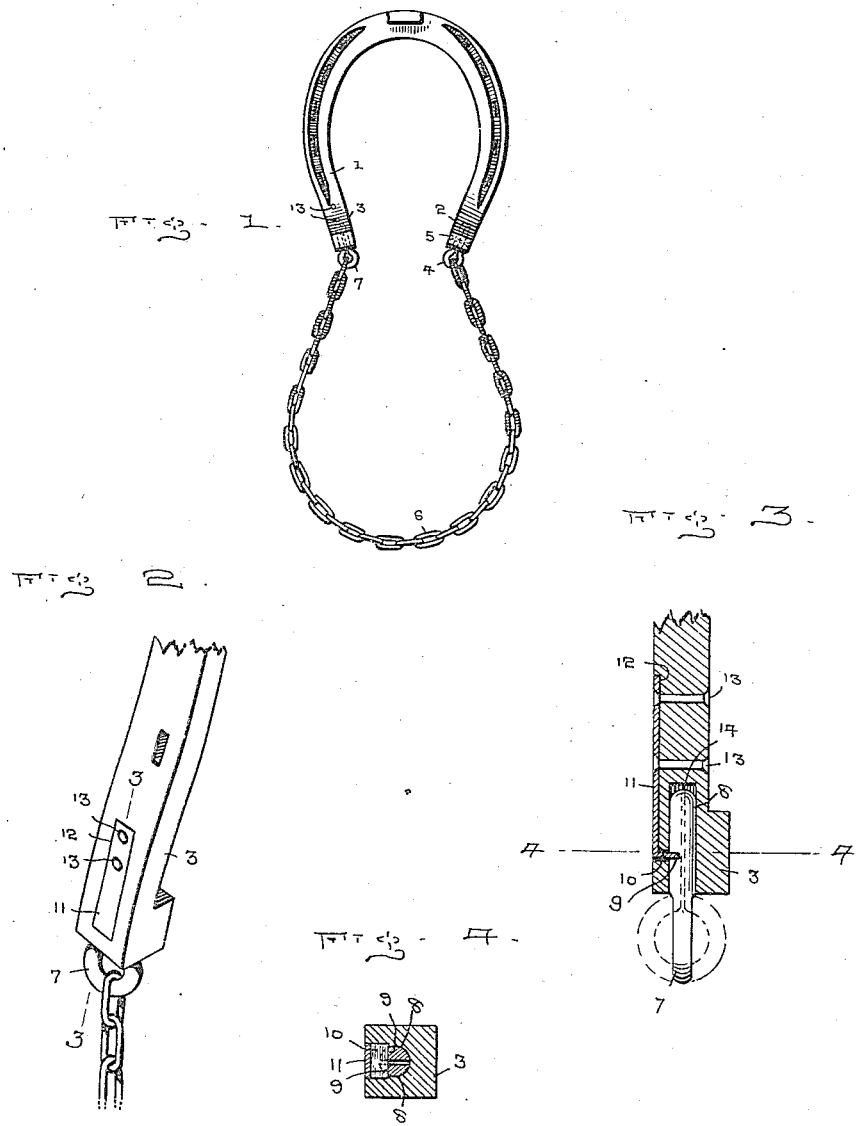

CYRUS A. WHITTAKER, OF FREEBURG, ILLINOIS.

KEY-RING.

1,266,365.  Specification of Letters Patent.  Patented May 14, 1918.

Application filed April 11, 1917. Serial No. 161,260.

*To all whom it may concern:*

Be it known that I, CYRUS A. WHITTAKER, a citizen of the United States, residing at Freeburg, in the county of Saint Clair and State of Illinois, have invented certain new and useful Improvements in Key-Rings; and I do hereby declare the following to be a full, clear, and exact description of the invention, such as will enable other skilled in the art to which it appertains to make and use the same.

This invention relates to a key ring, and the principal object of the invention is to provide a novel construction of key ring which is simple, cheap and inexpensive to maunfacture, and of durable and substantial material, and effective in operation.

With this object in view the invention consists in the improved construction, arrangement and combination of parts, hereinafter fully described and afterward specifically claimed.

In order that the construction and operation thereof may be readily comprehended, I have illustrated an approved embodiment of my invention in the accompanying drawings and will now proceed to fully describe the same in connection with said drawings in which—

Figure 1 represents a side elevation of my novel construction of key ring,

Fig. 2, a detailed perspective view of one of the free ends of the U-shaped member showing the removable split eye pin connected thereto, Fig. 3, a vertical sectional view taken on the line 3—3 of Fig. 2, and Fig. 4 a transverse sectional view taken on a line 4—4 of Fig. 3.

Similar characters of reference are used to designate corresponding parts.

Referring more particularly to the drawings the reference numeral 1 indicates a substantially U-shaped member, which is provided with free ends 2 and 3 respectively.

The free end 2 of the member 1 is provided with an inwardly extending socket in which is arranged a pin 4, secured in place by a pin 5 extending transversely through the end portion 2 and the pin.

A key chain 6 has one end attached to the eye pin 4, while its opposite end is attached to a split eye pin 7, each of the split ends 8 being substantially semicircular in cross section, as clearly shown in Fig. 4, and designed to be normally spaced slightly apart. Each of the ends 8 is provided with a transversely extending notch 9 designed to receive the inturned end 10 of a leaf spring 11 arranged in a recess in one side face of the free end 3 of the U-shaped member, the spring being securely held within the recess by rivets or other suitable fastening devices 13 and the inturned end projecting through the end 3 into the pin socket 14.

To remove the split eye pin 7 from the socket 14 extending in from the outer end of the end 3, it is simply necessary to rotate it until the inturned end of the spring 11 is forced out of the notches 9 whereupon the pin may be readily removed from the socket.

The split pin 7 is preferably constructed so that its split semicircular ends will normally be spaced apart, and in order to insert the ends into the socket 14 it will be necessary to press the semicircular ends together, after which the pin may be pressed into the socket until the inturned end 10 of the spring engages in the notches 9. The ends of the pin 7 will be frictionally held within the socket 14 against accidental or casual rotation, thus eliminating any possibility of the pin becoming accidentally disconnected from the end 3.

What I claim is:

A key ring comprising a substantially U-shaped member having a socket formed in one free end, said free end being formed with an opening extending transversely through it into communication with the socket, a leaf spring attached to one side of said free end and provided with an inturned end adapted to project through said opening into the socket, a key chain having one end attached to the other free end of said member, and an eye pin attached to the other end of said key chain and provided transversely of its end with a notch adapted to receive the inturned end of the spring when the pin is inserted in the socket.

In testimony whereof I have signed my name to this specification in the presence of two subscribing witnesses.

CYRUS A. WHITTAKER.

Witnesses:
EMMA A. WHITTAKER,
C. CLINTON WHITTAKER.